(12) United States Patent
Morikawa

(10) Patent No.: US 7,028,540 B2
(45) Date of Patent: Apr. 18, 2006

(54) DEVICE AND METHOD FOR DETECTING FORCE ACTING ON TIRE

(75) Inventor: Kenji Morikawa, Hekinan (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/065,938

(22) Filed: Feb. 25, 2005

(65) Prior Publication Data

US 2005/0188756 A1    Sep. 1, 2005

(30) Foreign Application Priority Data

Feb. 26, 2004    (JP)    ............................. 2004-052319

(51) Int. Cl.
*G01M 17/02* (2006.01)

(52) U.S. Cl. ...................................................... 73/146
(58) Field of Classification Search .................. 73/146, 73/862.541, 862.041–862.043; 280/5.52; 340/870.28

See application file for complete search history.

(56) References Cited

U.S. PATENT DOCUMENTS

| | | | |
|---|---|---|---|
| 4,748,844 A | | 6/1988 | Yoshikawa et al. |
| 5,817,951 A | * | 10/1998 | Cook et al. ............ 73/862.041 |
| 5,821,434 A | * | 10/1998 | Halliday ................. 73/862.541 |
| 5,894,094 A | | 4/1999 | Kuchler et al. |
| 6,534,430 B1 | | 3/2003 | Makino et al. |
| 2003/0000316 A1 | | 1/2003 | Isono |

FOREIGN PATENT DOCUMENTS

| | | |
|---|---|---|
| FR | 2 670 008 | 6/1992 |
| GB | 1 331 581 | 9/1973 |
| JP | 2002-014566 | 1/2002 |

* cited by examiner

*Primary Examiner*—William Oen
(74) *Attorney, Agent, or Firm*—Harness, Dickey & Pierce, PLC

(57) ABSTRACT

Two axle-side linking portions and two wheel-side linking portions are included in a rotation body. They are alternately arranged in four positions that are disposed, with equal intervals, along a circumference of a coaxial circle within the rotation body. Four regions located between the axle-side linking portions and the wheel-side linking portions are formed by an elastically deformable member. Further, four ceramic load sensors are arranged respectively in middle positions of the four regions along the coaxial circle. Force acting on a tire is thereby detected only from detection values by a load sensor group of the four load sensors.

6 Claims, 5 Drawing Sheets

DEVICE AND METHOD FOR DETECTING FORCE ACTING ON TIRE

CROSS REFERENCE TO RELATED APPLICATIONS

This application is based on and incorporates herein by reference Japanese Patent Application No. 2004-52319 filed on Feb. 26, 2004.

FIELD OF THE INVENTION

The present invention relates to a technology that detects force acting on a tire of a vehicle.

BACKGROUND OF THE INVENTION

There is proposed a tire-action-force detecting device for detecting grounding reaction force acting on a tire, for controlling an anti-lock brake system (ABS) or a traction control system. This detecting device detects a slip ratio of a tire to thereby enable calculation of a road-surface friction coefficient. Here, the calculation of the slip or the like is executed by using torque acting on a tire and a detection value such as a rotation number of the tire, as described in Patent Document 1.

Patent Document 1: JP-2003-14563 A (US20030000316A1)

In the above detecting device, the torque acting on a tire is detected without any problem. In contrast, the reaction force (vertical force) acting on a tire needs to be calculated using a tire rotation speed obtained from a relative rotation angle of the tire from a wheel speed sensor or the like, which thereby gives a load to a calculating unit. To perform a calculation following the tire rotation speed, a high-speed processor is required, which increases costs. Further, the calculating unit requires a given area or more, so that it is difficult to decrease the body size.

SUMMARY OF THE INVENTION

It is an object of the present invention to provide a device or method for detecting force acting on a tire. This device or method enables downsizing of a detecting unit and calculation of torque and reaction force (or vertical force), based on outputs from sensors, while securing strength in an axial direction.

To achieve the above object, a device detecting force acting on a tire is provided with the following. A rotation body is included between an axle and a disk wheel to be rotatable around the axle, integrally with the wheel disk. Axel-side linking portions are included in the rotation body for linking with the axle. Wheel-side linking portions are included in the rotation body for linking with the disk wheel. At least one pair of a first load sensor and a second load sensor is included. The first load sensor is arranged, in a rotational direction around the axle, in an order of the axle-side linking portion, the first load sensor, and the wheel-side linking portion. In contrast, the second load sensor is arranged, in the rotational direction around the axle, in an order of the wheel-side linking portion, the second load sensor, and the wheel-side linking portion. Sandwiched portions are included. Each of the sandwiched portions is provided between the wheel-side linking portion and the wheel-side linking portion to include one of the first load sensor and the second load sensor, and is formed of a member that is elastically deformable in the rotational direction. Here, when a torque around the axle is transmitted to the rotation body from one of the axle-side linking portion and the wheel-side linking portion, the axle-side linking portion and the wheel-side linking portion cause the sandwiched portions to be elastically deformed. When the sandwiched portions are deformed, one of the first load sensor and the second load sensor receives compression force while the other receives extension force. The force acting on the tire is detected based on the received compression force and the received extension force.

In this structure, for instance, by using loads detected by two load sensors and a rotation angle of the rotation body, force vertically acting on a tire or grounding reaction force can be calculated.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
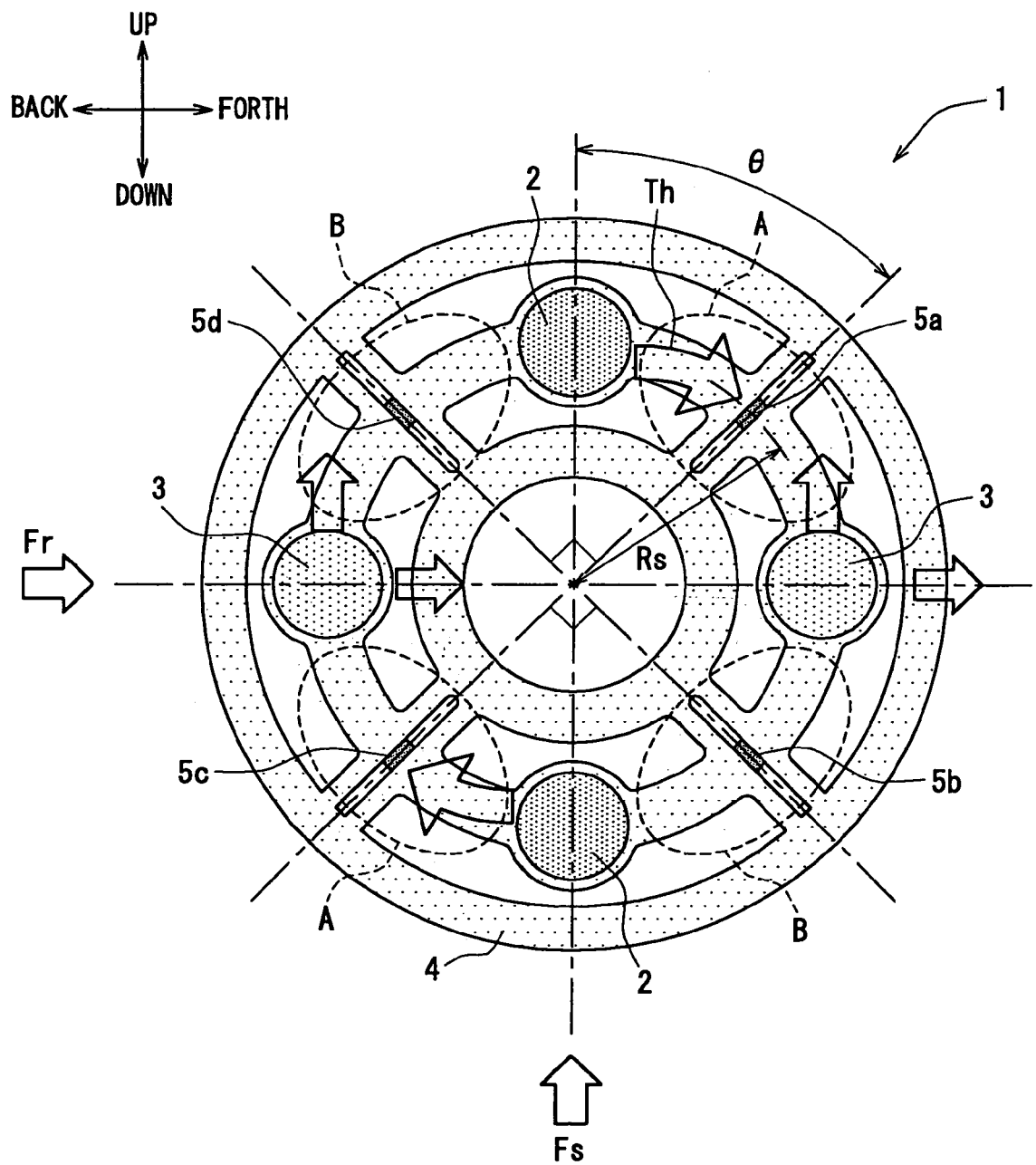
FIG. 1 is a view showing an overall structure of a device for detecting force acting on a tire according to an embodiment of the present invention.

An overall structure of a tire-action-force detecting device that detects force acting on a tire according to an embodiment of the present invention is shown in FIG. 1. The device 1 includes a circular rotation body 4 with its circular center being on a rotational axis. The rotation body 4 includes linking portions 2, 3 on a circumference of a coaxial circle whose center is on the rotational axis. Further, the linking portions 2, 3 are positioned to evenly divide the circumference of the circle into four portions. Here, the linking portions 2, 3 include axle-side linking portions 2 that link with a drive shaft or an axle 10, and wheel-side linking portions 3 that link with a disk wheel 22. Each of the axle-side linking portions 2 and each of the wheel-side linking portions 3 are disposed alternately with each other on the circumference of the coaxial circle.

The axle-side linking portion 2 and the wheel-side linking portion 3 sandwich an elastically-deformable region A, B therebetween. The region A is arranged in a clockwise direction (in FIG. 1) in an order of the axle-side linking portion 2, the region A, and the wheel-side linking portion 3, as shown in FIG. 1. In contrast, the region B is arranged in the clockwise direction in an order of the wheel-side linking portion 3, the region B, and the axle-side linking portion 2, as shown in FIG. 1. The regions A include a first load sensor 5a and a third load sensor 5c, while the regions B include a second load sensor 5b and a fourth load sensor 5d. These load sensors 5 (5a to 5d) are arranged respectively in middle positions within the regions A, B on the circumference of the circle. Thus, with respect to the rotational axis of the rotation body 4, the linking portions 2, 3 and the four load sensors 5 are symmetrically arranged, so that elastic deformations formed, in the rotation body 4 and the load sensors 5, are offset each other in the rotational direction.

Figure 2:
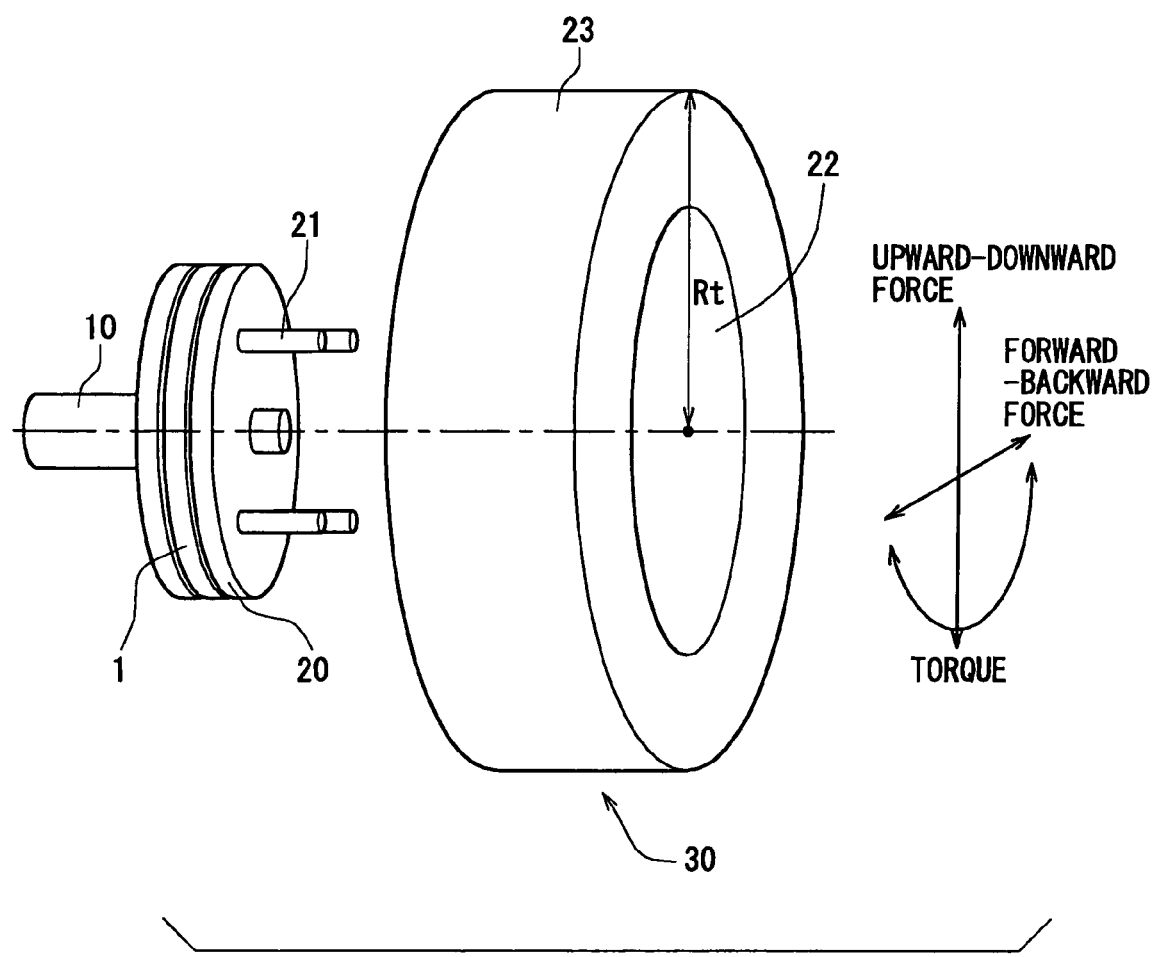
FIG. 2 is a view showing assembling of the device for detecting force acting on a tire, to a disk wheel and a tire.

Assembling of the device 1 into a vehicle wheel 30 is shown in FIG. 2. Here, the vehicle wheel 30 is an assembly of a tire 23 and disk wheel 22. A rubber-made tire 23 is assembled to the outer periphery of the disk wheel 22. The disk wheel 22 has the same axis as the drive shaft (or axle) 10, and is integrally rotatably held by a retaining portion 20. The retaining portion 20 is integrally rotatably linked with the rotation body 4 via the wheel-side linking portions 3 with its rotational axis being the same as the rotational axis of the driving shaft 10. For instance, the retaining portion 20 can be a hub.

Figure 3:
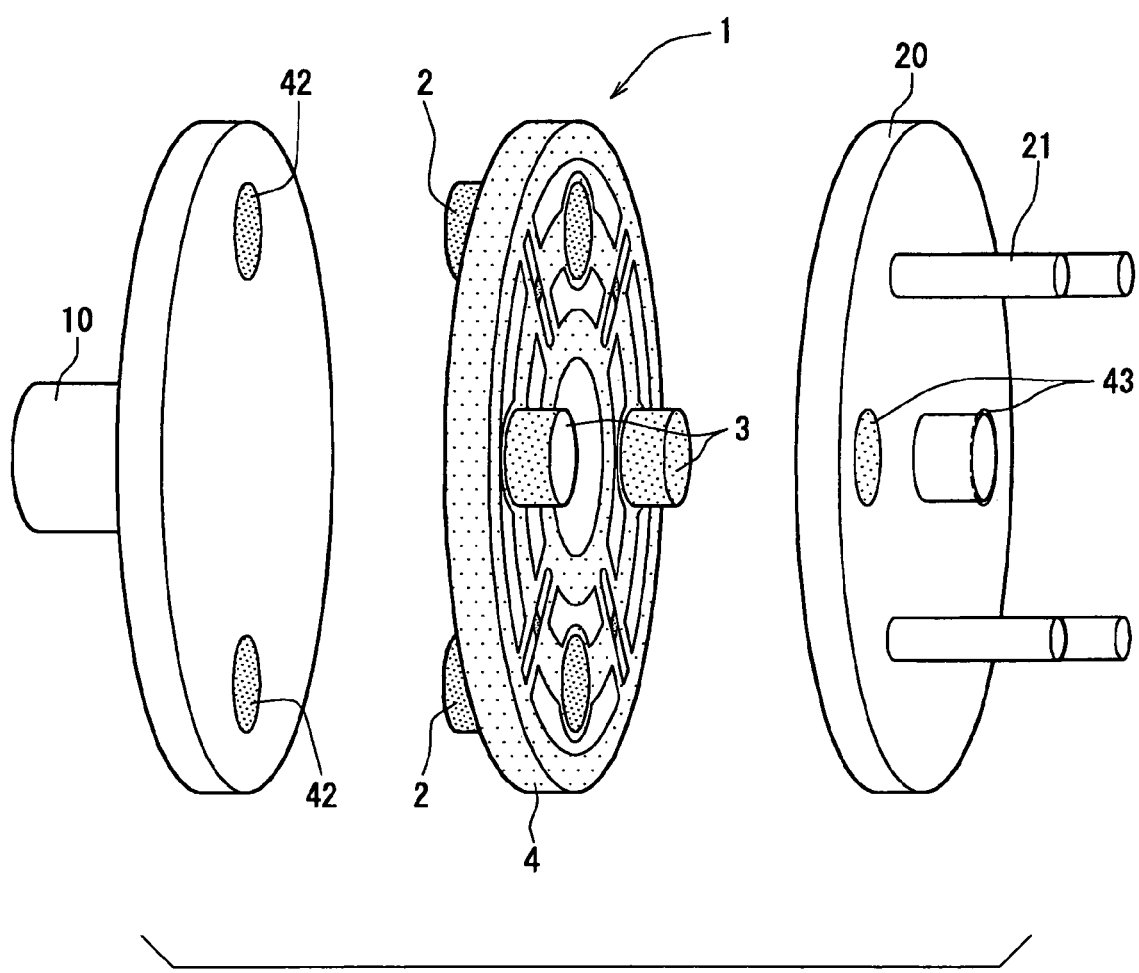
FIG. 3 is a view showing linking portions of the device for detecting force acting on a tire.

Assembling of the rotation body 4, the drive shaft 10, and the retaining portion 20 is shown in FIG. 3. The retaining portion 20 includes four attachment bolts 21 to be thereby coaxially attachable to and detachable from the disk wheel 22. The retaining portion 20 further includes two holes 43 that the wheel-side linking portions 3 of the rotation body 4 are fitly inserted into. The drive shaft 10 has in its rotation-body-side surface a circular shape to face the rotation body 4. This circular surface has two holes 42 that the axle-side linking portions 2 of the rotation body 4 are fitly inserted into. Thus, the vehicle wheel 30 including the disk wheel 23, the retaining portion 20, the rotation body 4 of the detecting portion, and the driving shaft 10 share the same rotational axis of the long axis of the drive shaft 10 to be integrally rotatable.

Next, the load sensors 5 used for the tire-action-force detecting device 1 will be explained below. The load sensors 5 can include a load sensor element whose primary material is ceramic. The load sensors 5 thereby have high rigidity, so that they can be downsized and easily mounted. Further, the elastically deformable regions A, B have relatively high rigidities although they are lower than those of the load sensors 5. The overall rigidity of the rotation body 4 can be thereby increased, so that the sensor portion can be constructed as a rigid body being resistant to forces from any directions. As a result, the rotation body including the load detecting portion can be constructed as one structure.

In this case, the load sensor 5 can be constructed to consist of a pressure-sensitive member and an insulating member covering the pressure-sensitive member. The pressure-sensitive member includes an electrically insulating ceramic member as a matrix; the pressure-sensitive member is formed by electrically continuously dispersing, to the matrix, particles having effects of pressure resistance (or piezoresistance). These particles having effects of pressure resistance can be formed by at least one of the following materials:

(1) perovskite-like $(Ln_{1-x}Ma_x)_{1-y}MbO_{3-z}$ ($0 < x \leq 0.5$, $0 \leq y \leq 0.2$, $0 \leq z \leq 0.6$, Ln: rare earth metal, Ma: one or more alkaline earth metals, Mb: one or more transition metals), e.g., $La_{1-x}Sr_xMnO_3$ ($0 \leq x \leq 1$).

(2) layered perovskite-like $(Ln_{2-u}Ma_{1+u})_{1-v}Mb_2O_{7-w}$ ($0 < u \leq 1.0$, $0 \leq v \leq 0.2$, $0 \leq w \leq 1.0$, Ln: rare earth metal, Ma: one or more alkaline earth metals, Mb: one or more transition metals)

On the other hand, the matrix material can be one of the following materials: $ZrO_2$, $Al_2O_3$, $MgAl_2O_4$, $SiO_2$, $3Al_2O_3$-$2SiO_2$, $Y_2O_3$, $CeO_2$, $La_2O_3$, $Si_3N_4$, or the like. This embodiment uses as the matrix material zirconia ($ZrO_2$) that has high rigidity at room temperature and tenacity to fracture. The hub of the vehicle wheel of this embodiment is arranged at a heated part, so that zirconia can be properly used. The pressure-sensitive member is described in above-described Patent Document 1, JP-2001-242019 A, and JP-2002-145664 A, so that the detail will not be described.

On the other hand, it is effective that the insulating member covering the pressure-sensitive member preferably adopts ceramics in similarity to the pressure-sensitive member. Further, $Al_2O_3$, $MgAl_2O_4$, $SiO_2$, $3Al_2O_3$-$2SiO_2$, $Y_2O_3$, $CeO_2$, $La_2O_3$, $Si_3N_4$, or the like can be also adopted as the insulating member, as well as zirconia ($ZrO_2$). This embodiment uses zirconia as the insulating member, similarly in the pressure-sensitive member. Otherwise, this embodiment uses zirconia that includes pressure-resistive (piezoresistive) material as far as it is not electrically continuous.

Furthermore, the material of the load sensor 5 can be Si material that includes a small quantity of an additive element in order to cause effects of piezoresistance.

In thus-structured element, ohm resistance is varied depending on pressure due to applied load, so that load can be detected based on the varied ohm resistance.

Figure 4:
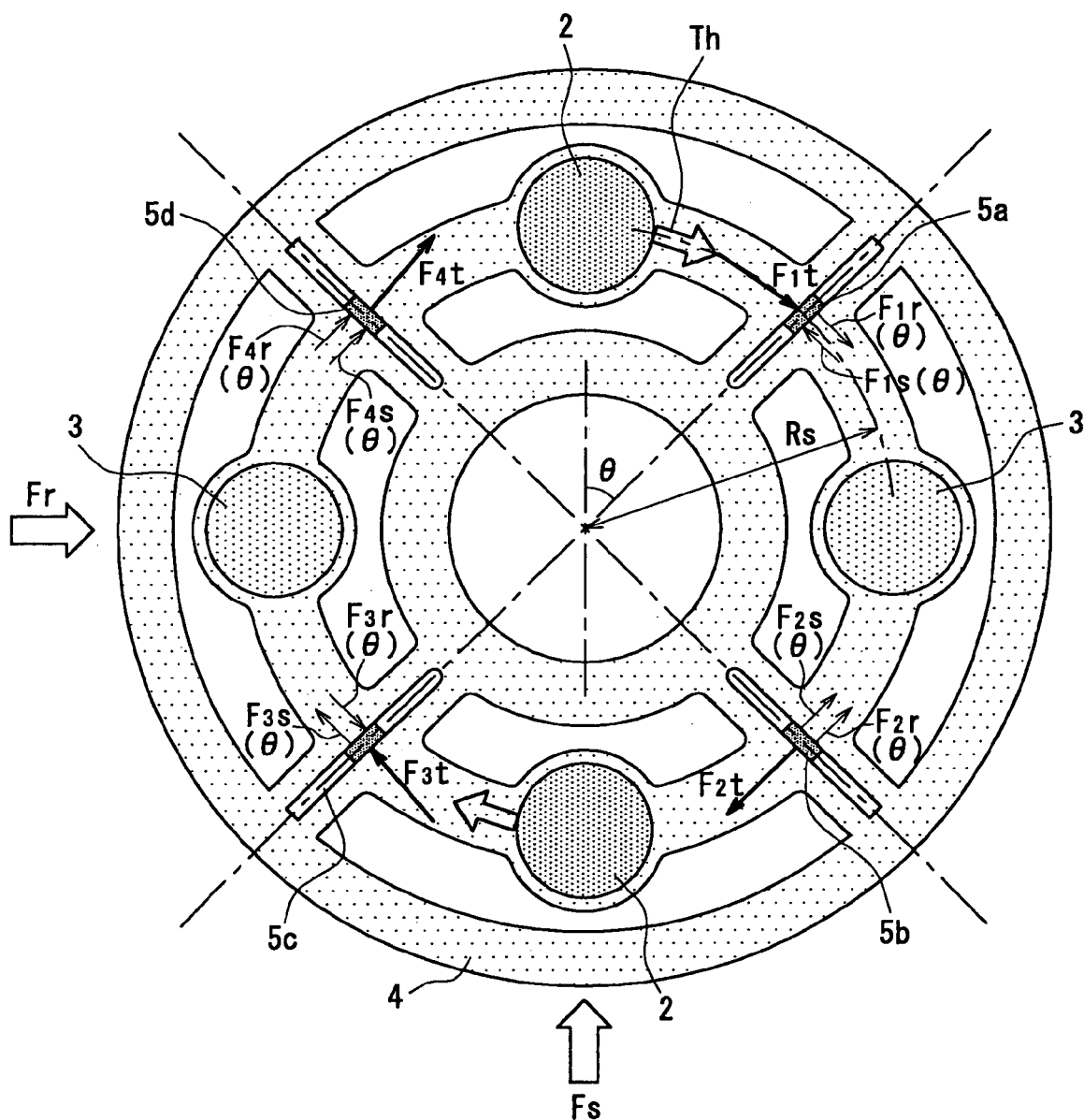
FIG. 4 is a view showing a relationship among detection outputs of four sensors of the device for detecting force acting on a tire.

Next, load detection by the load sensors 5 of the rotation body 4 will be explained with reference to FIG. 4. The rotation body 4 receives a clock-wise driving torque Th from the driving shaft 10 via the axle-side linking portions 2 to thereby be given rotation force around the rotational axis, as shown in FIG. 4. In contrast, the rotation body 4 receives, via the wheel-side linking portions 3, grounding reaction force (tire action force) Fs that acts, in a vertical direction of the vehicle, on the tire 23 of the vehicle wheel 30; and driving reaction force that acts in a forward-and-backward direction based on the rotation driving of the vehicle wheel 30. The load sensors 5 (5a to 5d) thereby detect loads F1, F2, F3, F4 that act in the circumferential direction because of rotation force based on the above forces.

Thus, the driving torque Th is applied via the axle-side linking portions 2 to the rotation body 4, and the grounding reaction force Fs and the driving reaction force Fr are applied via the wheel-side linking portions 3 to the rotation body 4. A rotation torque is thereby applied to the rotation body 4 in the clockwise direction in FIG. 4 (or in the rotational direction). In each of the regions A, a force is applied to cause the wheel-side linking portions 3 and the axle-side linking portions 2 to approach each other in the circumferential direction, so that they are compressed and deformed in the circumferential direction. The first and third load sensors 5a, 5c thereby receive compression load. In contrast, in each of the regions B, a force is applied to cause the wheel-side linking portions 3 and the axle-side linking portions 2 to depart from each other in the circumferential direction, so that they are extended and deformed in the circumferential direction. The second and fourth load sensors 5b, 5d thereby receive extension load. In this case, four load sensors 5 previously receive preliminary force, so that it can detect bi-directional compression and extension load.

Thus, in this embodiment, the four ceramic load sensors 5 are respectively arranged on the circular circumference with 90 degree intervals with respect to the rotational axis to thereby constitute a load sensor group. Only detection by the load sensor group enables the force acting on a tire (grounding reaction force) to be detected. The detecting method for the tire action force will be explained with reference to FIG. 4.

Suppose that the first load sensor 5a is located at a given rotation angle θ with respect to the rotational axis. In this case, the detection load F1 of the first load sensor 5a receives load F1t based on the driving torque Th (positive: in the clockwise direction); F1s(θ) that is, of the grounding reaction force Fs, a constituent perpendicular to the load sensor 5a; and F1r(θ) that is, of the driving reaction force Fr, a constituent perpendicular to the load sensor 5a. The received load is expressed by the following formula (3):

$$F1(\theta)=F1t+F1s(\theta)+F1r(\theta) \tag{3}$$

Suppose that the n-th load sensor (n=2 to 4) receives load Fnt based on the driving torque Th; Fns(θ) that is, of the grounding reaction force Fs, a constituent perpendicular to the load sensor 5n; and Fnr(θ) that is, of the driving reaction force Fr, a constituent perpendicular to the load sensor 5n. In this case, similarly, the load detections F2(θ), F3(θ), F4(θ) of the second load sensor 5b, the third load sensor 5c, and the fourth load sensor 5d are respectively expressed by the following formulae (4), (5), (6):

$$F2(\theta)=F2t+F2s(\theta)+F2r(\theta) \tag{4}$$

$$F3(\theta)=F3t+F3s(\theta)+F3r(\theta) \tag{5}$$

$$F4(\theta)=F4t+F4s(\theta)+F4r(\theta) \tag{6}$$

Here, the positive direction is the clockwise direction for the first and third load sensors 5a, 5c, while the positive direction is the counterclockwise direction for the second and fourth load sensors 5b, 5d.

Next, when the (sensor-located) radius of the circle is Rs, F1t, F2t, F3t, and F4t that are respectively applied to the first load sensor 5a, the second load sensor 5b, the third load sensor 5c, and the fourth load sensor 5d, are expressed by the following formulae (7), (8), (9), (10):

$$F1t=(1/4)\times(Th/Rs) \tag{7}$$

$$F2t=(1/4)\times(-Th/Rs) \tag{8}$$

$$F3t=(1/4)\times(Th/Rs) \tag{9}$$

$$F4t=(1/4)\times(-Th/Rs) \tag{10}$$

Here, Th is the driving torque that is applied to the entire rotation body 4 and its positive direction is set to the clockwise direction. Formulae (7), (9) indicate compression load, so that those are represented in positive values. In contrast, formulae (8), (10) indicate extension load, so that those are represented in negative values.

Further, the grounding reaction forces F1s, F2s, F3s, and F4s that are perpendicularly applied to the first load sensor 5a, the second load sensor 5b, the third load sensor 5c, and the fourth load sensor 5d, respectively, are expressed by the following formulae (11), (12), (13), (14):

$$F1s(\theta)=(1/2)\times(-Fs)\times\sin(\theta) \tag{11}$$

$$F2s(\theta)=(1/2)\times Fs\times\cos(\theta) \tag{12}$$

$$F3s(\theta)=(1/2)\times Fs\times\sin(\theta) \tag{13}$$

$$F4s(\theta)=(1/2)\times(-Fs)\times\cos(\theta) \tag{14}$$

Here, Fs is the grounding reaction force that is applied to the entire rotation body 4 in the vertical direction of the vehicle and its positive direction is set to the upward direction.

Further, when a radius from the rotational axis to the outer periphery of the tire is Rt, the driving reaction forces F1r, F2r, F3r, and F4r that are perpendicularly applied to the first load sensor 5a, the second load sensor 5b, the third load sensor 5c, and the fourth load sensor 5d, respectively, are expressed by the following formulae (15), (16), (17), (18):

$$F1r(\theta)=(1/2)\times(Th/Rt)\times\cos(\theta) \tag{15}$$

$$F2r(\theta)=(1/2)\times(Th/Rt)\times\sin(\theta) \tag{16}$$

$$F3r(\theta)=(1/2)\times(-Th/Rt)\times\cos(\theta) \tag{17}$$

$$F4r(\theta)=(1/2)\times(-Th/Rt)\times\sin(\theta) \tag{18}$$

Here, Fr is the driving reaction force that is applied to the entire rotation body 4 in the forward and backward direction of the vehicle and its positive direction is set to the forward direction.

Here, the rotation torque Th that is applied to the entire rotation body 4 is expressed by the following formula (19):

$$Th=(F1t-F2t+F3t-F4t)\times Rs \tag{19}$$

In contrast, T that is a computed value is expressed using F1(θ), F2(θ), F3(θ), F4(θ) that are detection values of the first load sensor 5a, the second load sensor 5b, the third load sensor 5c, and the fourth load sensor 5d, respectively, as below:

$$T=\{F1(\theta)-F2(\theta)+F3(\theta)-F4(\theta)\}\times Rs \tag{20}$$

As shown in this formula (20), the rotation torque T that is applied to the entire rotation body 4 can be obtained from the respective detection values by the four load sensors 5 of the rotation body 4, so that other values such as the rotation angle θ is unnecessary.

In this case, grounding load Fcs that is a computed value can be expressed by the following:

$$Fcs=\{(F1(\theta)-F3(\theta))^2+(F2(\theta)-F4(\theta))^2-(T/Rt)^2\}^{1/2} \tag{22}$$

This formula is deduced from the following. The left terms of following formula (23) are simplified by Formulae (3) to (18) into the right terms without terms having the angle θ as below:

$$(F1(\theta)-F3(\theta))^2+(F2(\theta)-F4(\theta))^2=Fs^2+(Th/Rt)^2 \tag{23}$$

Here, Fs is grounding reaction force to be obtained, so that Fcs can be obtained by subtracting $(Th/Rt)^2$ from the left terms of Formula (23). Further, $(Th/Rt)^2$ can be expressed as below:

$$(Th/Rt)^2=(T/Rt)^2 \tag{24}$$

As a result, obtaining Fs means obtaining Fcs. Namely, the grounding load Fs (Fcs) can be obtained by using the detection values F1(θ), F2(θ), F3(θ), F4(θ) of the load sensors 5 and the fixed values such as the sensor-located radius Rs and the tire radius Rt.

Figure 5:
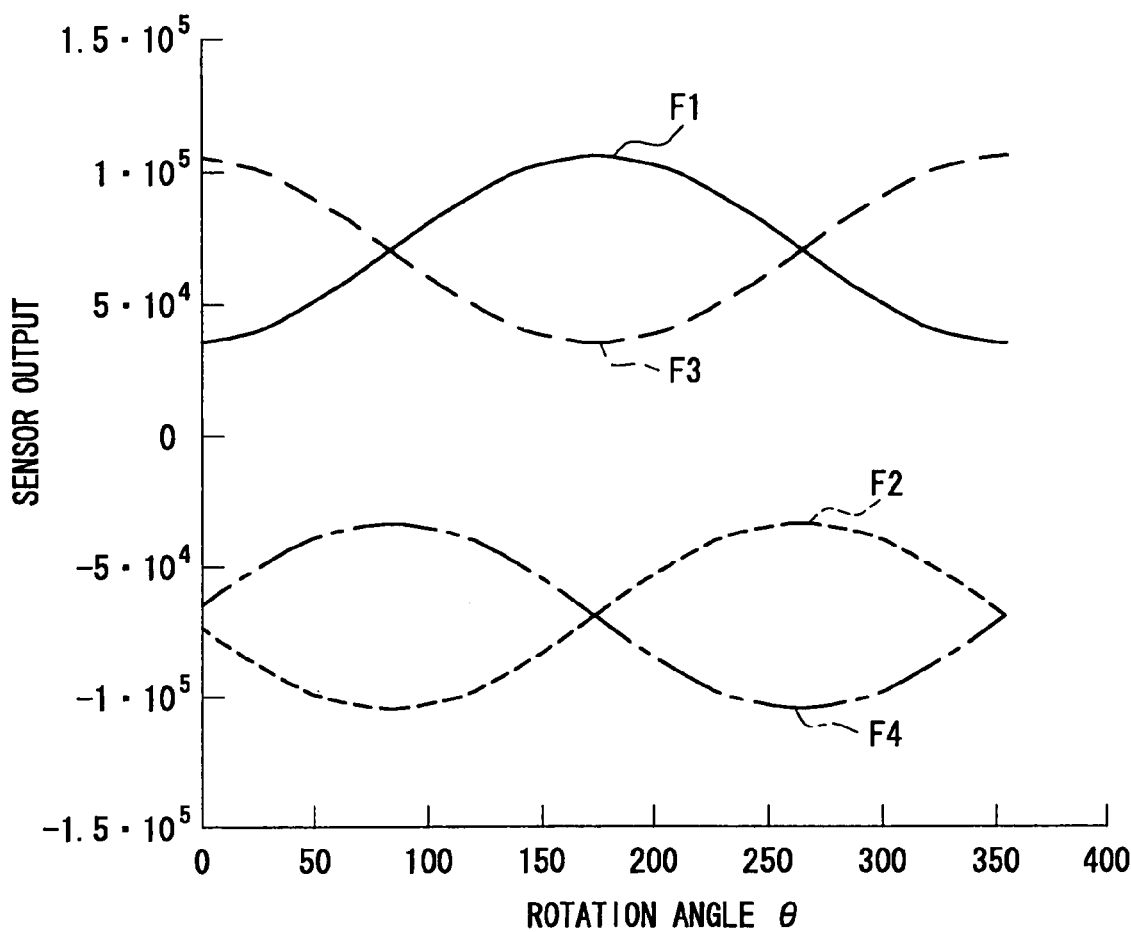
FIG. 5 is a graph showing detection outputs of the four sensors.

The detection values F1, F2, F3, F4 of the load sensors 5a, 5b, 5c, 5d are shown in FIG. 5. As shown in FIG. 5, the load sensor 5a and the load sensor 5b of the pair receive the respective loads reverse to each other, so that sensor outputs F1, F3 are deviated from each other by 180 degrees in their phases. Similarly, in the load sensor 5c and the load sensor 5d of the pair, the sensor outputs F2, F4 are deviated from each other by 180 degrees in their phases.

Figure 6:
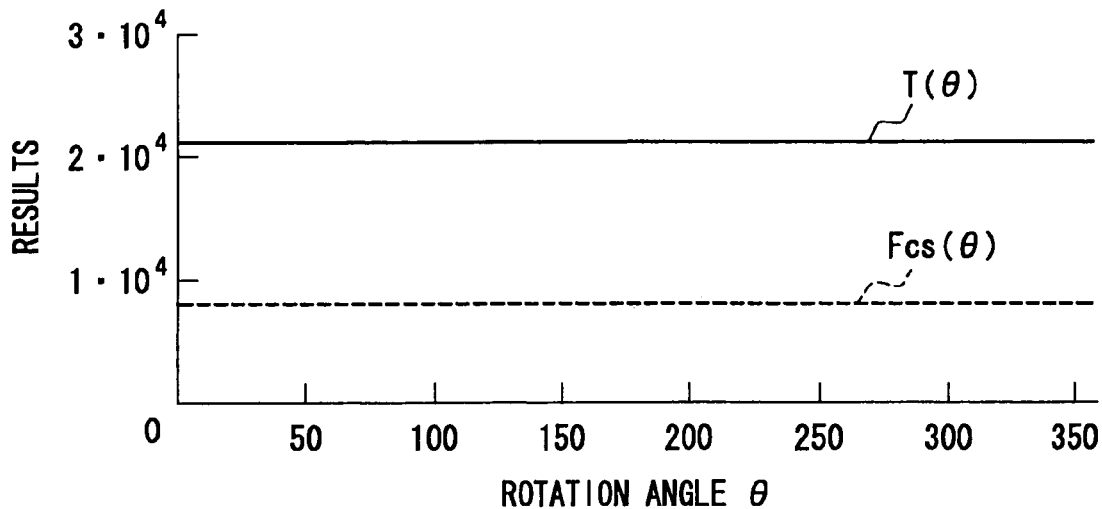
FIG. 6 is a graph showing results from calculation of rotation torque T and force acting on a tire Fcs.

The rotation torque T and the grounding reaction force Fcs that are obtained based on the sensor outputs F1, F2, F3, F4 shown in FIG. 5 are shown in FIG. 6. Here, parameters are as follows: the driving torque Th is 21000 N-m, the sensor-located radius Rs is 0.075 m, and the tire radius Rt is 0.3 m. As shown in FIG. 6, the calculation results of the rotation torque T and the grounding reaction force Fcs are only dependent on the detection values by the load sensors 5, while they are not dependent on the rotation angle θ of the rotation body 4. Consequently, the grounding load Fcs can be obtained without installing a detecting unit for the rotation angle θ, so that the cost can be decreased.

The above-described device for detecting force acting on a tire has a following feature. A device for detecting force acting on a tire according to the above embodiment is provided with the following. A rotation body is included between the axle and the disk wheel, to be integrally rotatable with the wheel disk around the axle. Axle-side linking portions are included in the rotation body and link with the axle, while wheel-side linking portions are included in the rotation body and link with the disk wheel. These linking portions are arranged on a circumference of a circle having a given radius with its center being the rotational axis. At least one sensor group is included to be composed of four load sensors, from a first to a fourth. The four load sensors are arranged in a rotational direction around the axle, in an order from the first to the fourth, on the circumference of the circle with 90-degree intervals. The first load sensor and the third load sensor constitute a first sensor pair to be inserted in the order of the axle-side linking portion, the first load sensor or the third load sensor, and the wheel-side linking portion in a rotational direction around the axle. In contrast, the second load sensor and the fourth load sensor constitute a second sensor pair to be inserted in an order of the wheel-side linking portion, the second load sensor or the fourth load sensor, and the axle-side linking portion in the rotational direction around the axle. Sandwiched portions that are sandwiched between the axle-side linking portions and the wheel-side linking portions and include the four load sensors, respectively, are formed of a member that is elastically deformable around the axle. When torque around the axle is transmitted to the rotation body from one of the axle-side linking portion and the wheel-side linking portion, the axle-side linking portion and the wheel-side linking portion cause the sandwiched portions to be elastically deformed. When the sandwiched portions are deformed, one of the first sensor pair and the second sensor pair receives compression force while the other receives extension force. The first sensor pair and the second sensor pair thereby detect the received compression force and the received extension force. As a result, the force acting on the tire can be detected only based on the detected values.

It will be obvious to those skilled in the art that various changes may be made in the above-described embodiments of the present invention. However, the scope of the present invention should be determined by the following claims.

What is claimed is:

1. A device for detecting force acting on a tire that is attached to a disk wheel that rotates around an axle, the device comprising:
   a rotation body that is provided between the axle and the disk wheel and is integrally rotatable with the disk wheel around the axle,
   axle-side linking portions that are included in the rotation body and linked with the axle;
   wheel-side linking portions that are included in the rotation body and linked with the disk wheel;
   at least one pair of a first load sensor and a second load sensor, wherein the first load sensor is arranged, in a rotational direction around the axle, in an order of a first axle-side linking portion, the first load sensor, and a first wheel-side linking portion, wherein the second load sensor is arranged, in the rotational direction around the axle, in an order of the first wheel-side linking portion, the second load sensor, and a second axle-side linking portion; and
   sandwiched portions, each of the sandwiched portions being provided between a respective axle-side linking portion and a respective wheel-side linking portion, wherein each of the sandwiched portions includes one of the first load sensor and the second load sensor and is formed of a member that is elastically deformable in the rotational direction,
   wherein, when a torque around the axle is transmitted to the rotation body from one of the axle-side linking portion and the wheel-side linking portion, the axle-side linking portion and the wheel-side linking portion cause the sandwiched portions to be elastically deformed,
   wherein, when the sandwiched portions are deformed, one of the first load sensor and the second load sensor receives compression force while the other receives extension force, and
   wherein the force acting on the tire is detected based on the received compression force and the received extension force.

2. The device for detecting force acting on a tire of claim 1,
   wherein the first load sensor and the second load sensor include zirconia and $La_{1-x}Sr_xMnO_3$ ($0 \leq x \leq 1$) that includes effect of pressure resistance.

3. The device for detecting force acting on a tire of claim 1,
   wherein at least two pairs of the first load sensor and the second load sensor are provided,
   wherein the first load sensor of one pair of the two pairs is designated as a third load sensor, while the second load sensor of the one pair is designated as a fourth load sensor,
   wherein at least one sensor group is constituted by the first load sensor, the second load sensor, the third load sensor, and the fourth load sensor,
   wherein the four load sensors are arranged in an order of the first load sensor, the second load sensor, the third load sensor, and the fourth load sensor, on a circumference of a circle having a center that is on a rotational axis of the axle, in respective four regions that are formed by dividing the circumference of the circle with 90-degree intervals, and
   wherein the force acting on the tire is detected only based on values detected by the at least one sensor group.

4. The device for detecting force acting on a tire of claim 3,
   wherein the first load sensor, the second load sensor, the third load sensor, and the fourth load sensor are arranged on the circumference of the circle with 90-degree intervals,
   wherein a detection load in the rotational direction detected by the first load sensor is defined as F1,
   a detection load in a direction reverse to the rotational direction detected by the second load sensor is defined as F2,
   a detection load in the rotational direction detected by the third load sensor is defined as F3,
   a detection load in the direction reverse to the rotational direction detected by the fourth load sensor is defined as F4,
   a distance from a center of the rotation body to each of the load sensors is defined as Rs,
   a radius of the tire is defined as Rt,
   a rotation torque is defined as T, and
   the force acting on the tire that is vertically applied is defined as Fcs, and wherein T is expressed by a first formula:

$$T=\{(F1+F3)+(F2+F4)\} \times Rs, \text{ and}$$

Fcs is expressed by a second formula:

$$Fcs=\{(F1-F3)^2+(F2-F4)^2-(T/Rt)^2\}^{1/2}.$$

5. A method for detecting force acting on a tire, the method using the second formula of claim 4.

6. A method for detecting force acting on a tire that is attached to a disk wheel that rotates around an axle, by using a detecting device that includes:
- a rotation body that is provided between the axle and the disk wheel and is integrally rotatable with the disk wheel around the axle,
- axle-side linking portions that are included in the rotation body and linked with the axle;
- wheel-side linking portions that are included in the rotation body and linked with the disk wheel;
- at least two pairs of a first load sensor and a second load sensor, wherein the first load sensor is arranged, in a rotational direction around the axle, in an order of a first axle-side linking portion, the first load sensor, and a first wheel-side linking portion, wherein the second load sensor is arranged, in the rotational direction around the axle, in an order of the first wheel-side linking portion, the second load sensor, and a second axle-side linking portion; and
- sandwiched portions, each of the sandwiched portions being provided between the a respective axle-side linking portion and a respective wheel-side linking portion, wherein each of the sandwiched portions includes one of the first load sensor and the second load sensor, and is formed of a member that is elastically deformable around the axle, wherein, when a torque around the axle is transmitted to the rotation body from one of the axle-side linking portion and the wheel-side linking portion, the axle-side linking portion and the wheel-side linking portion cause the sandwiched portions to be elastically deformed, wherein, when the sandwiched portions are deformed, one of the first load sensor and the second load sensor detects a value by receiving compression force while the other detects a value by receiving extension force, wherein the first load sensor of one pair of the two pairs is designated as a third load sensor, while the second load sensor of the one pair is designated as a fourth load sensor, wherein at least one sensor group is constituted by the first load sensor, the second load sensor, the third load sensor, and the fourth load sensor, wherein the four load sensors are arranged in an order of the first load sensor, the second load sensor, the third load sensor, and the fourth load sensor, on a circumference of a circle having a center that is on a rotational axis of the axle, with 90-degree intervals, wherein the force acting on the tire is detected only based on values detected by the at least one sensor group, wherein a detection load in the rotational direction detected by the first load sensor is defined as F1, a detection load in a direction reverse to the rotational direction detected by the second load sensor is defined as F2, a detection load in the rotational direction detected by the third load sensor is defined as F3, a detection load in the direction reverse to the rotational direction detected by the fourth load sensor is defined as F4, a distance from a center of the rotation body to each of the load sensors is defined as Rs, a radius of the tire is defined as Rt, a rotation torque is defined as T, and wherein T is expressed by a first formula:

$$T=\{(F1+F3)-(F2+F4)\} \times Rs,$$

the force acting on the tire that is vertically applied is defined as Fcs, the method comprising:

a step of detecting the force acting on the tire, defined as Fcs, using a second formula:

$$Fcs=\{(F1-F3)^2+(F2-F4)^2(T/Rt)^2\}^{1/2}.$$

* * * * *